United States Patent
Fujimori (10) Patent No.: US 12,528,188 B2
(45) Date of Patent: Jan. 20, 2026

(54) PROGRAM GENERATION DEVICE AND ROBOT CONTROL DEVICE

(71) Applicant: Fanuc Corporation, Yamanashi (JP)

(72) Inventor: Takahiro Fujimori, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 104 days.

(21) Appl. No.: 18/566,770

(22) PCT Filed: Jun. 16, 2021

(86) PCT No.: PCT/JP2021/022909
§ 371 (c)(1),
(2) Date: Dec. 4, 2023

(87) PCT Pub. No.: WO2022/264328
PCT Pub. Date: Dec. 22, 2022

(65) Prior Publication Data
US 2024/0269849 A1    Aug. 15, 2024

(51) Int. Cl.
*B25J 9/16*    (2006.01)
(52) U.S. Cl.
CPC ........... *B25J 9/1674* (2013.01); *B25J 9/1664* (2013.01)
(58) Field of Classification Search
CPC ....... B25J 9/1656; B25J 9/1674; B25J 9/1664
See application file for complete search history.

(56) References Cited

U.S. PATENT DOCUMENTS 5,877,604 A    3/1999  Kessler
9,802,286 B2   10/2017 Nishi et al.
(Continued)

FOREIGN PATENT DOCUMENTS

JP    05056577 A    3/1993
JP    10505216 A    5/1998
(Continued)

OTHER PUBLICATIONS

International Search Report and Written Opinion for International Application No. PCT/JP2021/022909, dated Sep. 7, 2021, 6 pages.

*Primary Examiner* — Dylan M Katz
(74) *Attorney, Agent, or Firm* — BUCHANAN INGERSOLL & ROONEY PC (57) ABSTRACT

The present invention provides: a program generation device provided with a function to identify a robot movement causing an inconvenient voltage drop and present a movement for easing said robot movement or automatically ease said robot movement; and a robot control device. This program generation device comprises: an electric current calculation unit which calculates the value of a driving electric current to be supplied to a motor in order to cause a robot to operate in accordance with a movement program; a drop voltage calculation unit which calculates an amount of instantaneous drop voltage in an electric circuit between the motor and an equipment power supply for supplying an electric current to the motor, on the basis of the calculated value of the driving electric current and the configuration of the electric circuit; a comparison unit which compares the calculated amount of instantaneous drop voltage with a predetermined first threshold value; and an output unit which outputs a target movement or an easing movement in the case where the amount of instantaneous drop voltage has exceeded the first threshold value and/or a correction unit which corrects a target movement to an easing movement in the movement program.

6 Claims, 6 Drawing Sheets

(56) References Cited

U.S. PATENT DOCUMENTS

| | | | | |
|---|---|---|---|---|
| 2014/0070752 A1* | 3/2014 | Otsuji | .................. | G05D 3/20 |
| | | | | 318/603 |
| 2019/0052216 A1 | 2/2019 | Tanaka et al. | | |
| 2020/0052642 A1* | 2/2020 | Kuroki | .................. | H02P 29/60 |
| 2020/0183361 A1 | 6/2020 | Yura | | |
| 2024/0154461 A1* | 5/2024 | Kiribuchi | .................. | H02P 6/16 |

FOREIGN PATENT DOCUMENTS

| | | | |
|---|---|---|---|
| JP | 2010277425 A | 12/2010 | |
| JP | 2019037018 A | 3/2019 | |
| JP | 2020091623 A | 6/2020 | |

\* cited by examiner

PROGRAM GENERATION DEVICE AND ROBOT CONTROL DEVICE

CROSS REFERENCE TO RELATED APPLICATIONS

This is the U.S. National Phase application of PCT/JP2021/022909, filed Jun. 16, 2021, the disclosure of this application being incorporated herein by reference in its entirety for all purposes.

FIELD OF THE INVENTION

The present invention relates to a program generation device for a robot, and a robot controller.

BACKGROUND OF THE INVENTION

In robots and NC machines, there is a well-known technique for protecting a motor from overload by using a current flowing through the motor and its integrated value (e.g., see Patent Literature 1). There is also a well-known technique for identifying that the motor is locked due to overload or that the operation of the motor is heavy, based on a drop in the motor voltage, and outputting an overload signal (e.g., see Patent Literature 2).

On the other hand, in a machining system using a machine tool and a robot, there is a well-known technique for displaying a program line in execution and a prefetched program line when an alarm occurs in the machine tool (e.g., see Patent Literature 3).

PATENT LITERATURE

[PTL 1] JP 1993(H05)-056557 A
[PTL 2] JP 1998(H10)-505216 A
[PTL 3] JP 2010-277425 A

SUMMARY OF THE INVENTION

In order to operate a robot to perform high-speed or high-torque operations such as rapid acceleration and transportation of heavy objects, it is necessary to apply a large drive current to a motor such as a servomotor which drives each axis of the robot. At this time, the voltage supplied to the motor momentarily drops, due to the impedance of a transformer which is a component of the robot controller, an external device which uses a facility power supply common to the robot, and a power transmission cable for supplying power from the facility power supply to the robot and the external device. When this voltage drop exceeds a certain level, the robot cannot follow the command because the current required for the motor cannot be supplied. As a result, an actual position is deviated from a command position, and a positional error corresponding to the difference between the command position and the actual position increases. When this positional error exceeds a preset threshold, there is a problem that a control system (a controller, etc.) of the robot determines that the exceedance is abnormal, outputs an alarm, and stops the robot.

One aspect of the present disclosure provides a program generation device configured to generate a motion program for controlling a robot configured to be operated by driving at least one motor, the program generation device comprising: a current calculation unit configured to calculate a value of a drive current to be supplied to the motor so that the robot is operated in accordance with the motion program; a drop voltage calculation unit configured to calculate an amount of instantaneous drop voltage in an electric circuit between the motor and a facility power supply for supplying a current to the motor, based on the value of the drive current calculated by the current calculation unit and a configuration of the electric circuit; a comparison unit configured to compare the amount of instantaneous drop voltage calculated by the drop voltage calculation unit with a predetermined first threshold value; and an output unit configured to output a corresponding motion or a mitigating motion when the amount of instantaneous drop voltage is higher than the first threshold value, and/or a correction unit configured to correct the corresponding motion to the mitigating motion in the motion program when the amount of instantaneous drop voltage is higher than the first threshold value.

Another aspect of the present disclosure provides a robot controller configured to control a robot configured to be operated by driving at least one motor, based on a motion program, the robot controller comprising: a voltage measurement unit configured to measure a value of a voltage at an inlet, an outlet or an inside of the robot controller, when a drive current for operating the robot in accordance with the motion program; a comparison unit configured to compare the value of the voltage measured by the voltage measurement unit with a predetermined second threshold value; and an output unit configured to output a corresponding motion or a mitigating motion when the value of the voltage is lower than the second threshold value, and/or a correction unit configured to correct the corresponding motion to the mitigating motion in the motion program when the value of the voltage is lower than the second threshold value.

According to the present disclosure, it is possible to detect or predict an excessive voltage drop when operating a robot based on a predetermined program, and to identify the operation which causes the voltage drop. Therefore, the corresponding motion statements in the program can be efficiently corrected.

DETAILED DESCRIPTION OF EMBODIMENTS OF THE INVENTION

Figure 1:
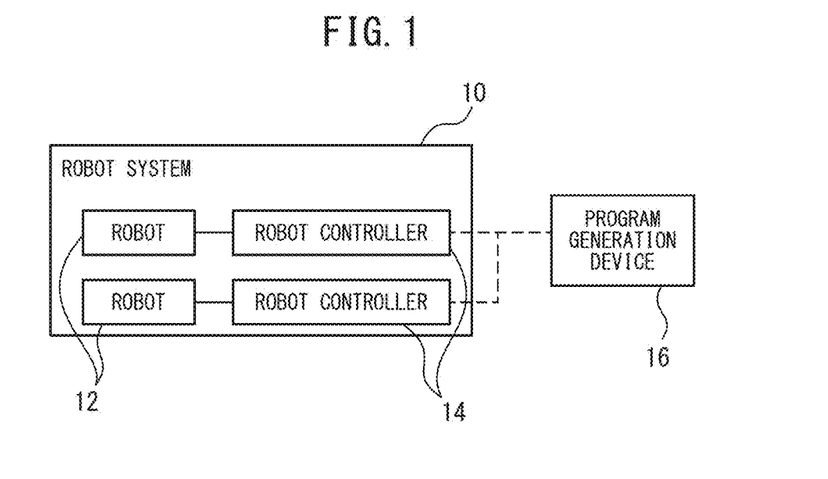
FIG. 1 is a block diagram of a robot system according to an embodiment.

FIG. 1 is a block diagram of a robot system including a robot controller according to a preferred embodiment. The robot system 10 includes at least one robot 12 such as an industrial vertical multi-joint robot, and at least one (usually the same number as the robot 12) robot controller 14 communicatively connected to the robot 12 by wire or wirelessly and configured to control the robot 12. Further, the robot controller 14 is communicably connected to a program generation device 16 configured to generate a robot program for motion control of the robot 12 by wire or wirelessly.

The robot control device 14 is configured to control the robot 12 based on a given robot program, and includes a processor and a memory, etc., for realizing the functions of each unit of the controller 14, which will be described later. The program generation device 16 is, for example, a personal computer (PC) which is independent of the robot controller 14 and has a processor and a memory, etc., for realizing the functions of each unit of the program generation device 16, which will be described later.

Figure 2A:
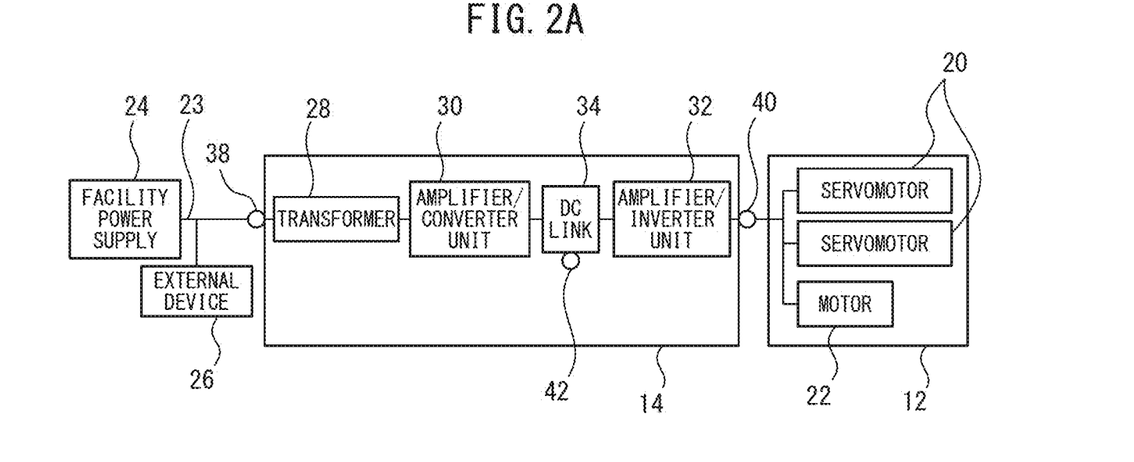
FIG. 2A is a block diagram showing an example or an electrical connection relationship between devices around a robot controller.

FIG. 2A shows an example of the electrical connection relationship of between devices around the robot controller 14, and specifically shows an electrical circuit from a facility power supply to a motor of the robot. The robot 12 includes at least one motor such as a servomotor 20 for driving each axis of the robot 12 and/or a motor 22 for driving an additional axis. A drive current is supplied to the motors 20 and 22 from a schematically shown facility power supply 24 via the robot controller 14 by a power transmission cable 23. In addition to the robot controller 14, the facility power supply 24 is electrically connected to an external device 26 such as an I/F (interface) board, a transformer, a machine tool, a signal system device, a maintenance device, etc.

The robot controller 14 includes a transformer 28 configured to transform an input voltage to the controller 14, an amplifier/converter unit 30 configured to convert AC to DC, an amplifier/inverter unit 32 configured to convert DC to AC, and a DC link 34 for inputting the DC converted by the amplifier/converter unit 30 to the amplifier/inverter unit 32.

The robot controller 14 further has a voltage measurement instrument configured to measure the voltage relating to the controller 14. Specifically, the controller has at least one of a first sensor 38 configured to measure the voltage at an inlet of the controller, or a second sensor 40 configured to measure the voltage at an outlet of the controller, or a third sensor 42 configured to measure the voltage at an inside (here, the voltage at the DC link 34) of the controller.

Figure 2B:
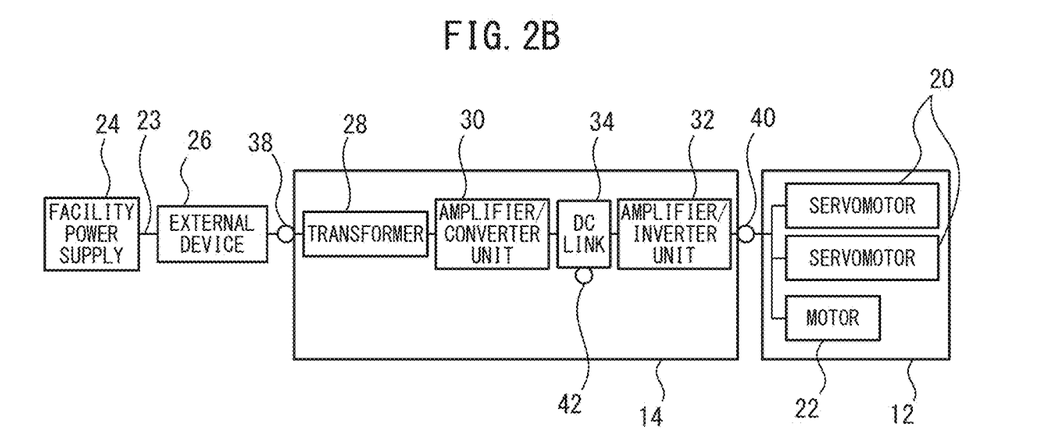
FIG. 2B is a block diagram showing another example or an electrical connection relationship between devices around a robot controller.

FIG. 2B shows another example of electrical connection relationship between devices around the robot controller 14. In FIG. 2B, unlike FIG. 2A in which the controller 14 and the external device 26 are connected in parallel, the facility power supply 24, the external device 26 and the controller 14 are connected in series. The other parts of FIG. 2B may be the same as those of FIG. 2A.

Since the transformer 28 has constant impedance, the current flowing through the transformer 28 causes an instantaneous voltage drop in the supply voltage to the motors 20 and 22. Further, the instantaneous voltage drop in the supply voltage to the motors 20 and 22 may also occur due to the current flowing through the transmission cables 23 of various thicknesses and/or the external device 26 connected to the common facility power supply 24. This instantaneous voltage drop is susceptible to the impedance of the external device 26, especially in the case of FIG. 2B. Due to these instantaneous voltage drops, the necessary current cannot be supplied to the servomotor 20, etc., the motion of the robot 12 cannot follow the command, and then a deviation occurs between the commanded position and the actual position. When a positional error based on this deviation exceeds a predetermined allowable value, the robot controller 14 is configured to determine that an abnormality occurs, output an alarm, and stop the robot 12. Here, a means for outputting an alarm includes an arbitrary means such as a display, voice, vibration of an object worn by the operator, etc., by which the operator can perceive the alarm. Such an alarm stoppage of the robot 12 leads to problems such as a significant decrease in production efficiency, especially when the robot 12 is used in a production line, etc. Therefore, in the following examples, a process for preventing an alarm stoppage of the robot 12 caused by the instantaneous voltage drop will be described.

First Example

Figure 3:
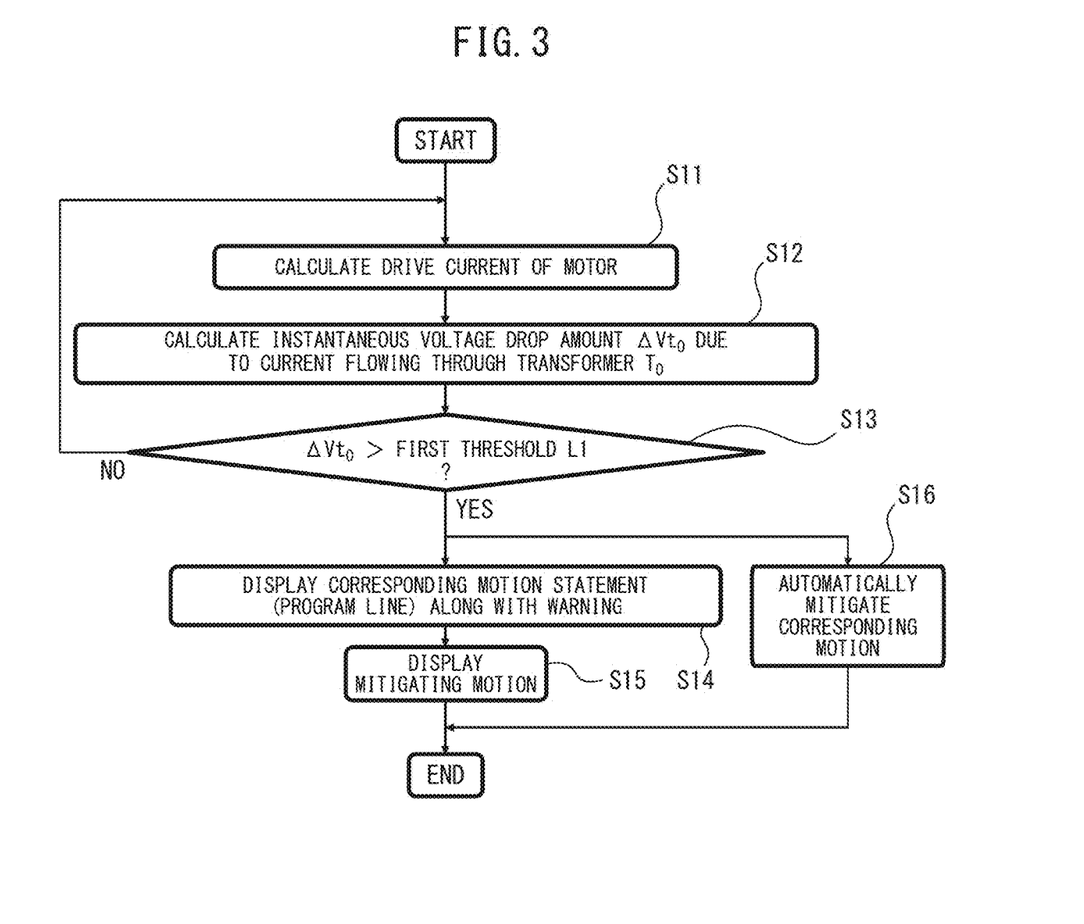
FIG. 3 is a flowchart showing a first example of a process of a program generation device.

FIG. 3 is a flowchart showing an example of a process in the program generation device 16 as the first example. Note that the process and calculation by the program generation device 16 may be considered as a simulation which can be executed off-line, and there is no need to actually operate the robot system. This also applies to second, third and fourth examples described below.

First, in step S11, a drive current I to be supplied to the servomotor 20, etc., which is necessary for executing a certain motion statement in the robot program, is calculated. Next, in step S12, a instantaneous voltage drop amount $\Delta Vt_0$ due to the drive current I flowing through the transformer 28 is calculated, by using the impedance value (usually known), etc., of the transformer 28.

In the next step S13, it is determined as to whether or not the instantaneous voltage drop amount $\Delta Vt_0$ calculated in S12 exceeds a predetermined first threshold value L1. If not, the process is returned to step S11 to process the next motion statement. Although not shown in the flowchart, when there is no motion sentence to be processed, the process terminates without returning to step S11. This also applies to second to fifth examples described below.

In step S13, when the instantaneous voltage drop amount $\Delta Vt_0$ exceeds the first threshold value L1, the voltage drop prevents the robot from following the command, and the positional error may exceed the allowable value, causing the robot to stop by alarm. In other words, the first threshold L1 is previously set to a value such that when $\Delta Vt_0$ exceeds L1, there is a high probability that the positional error of the robot 12 due to the voltage drop will exceed the allowable value. In this case, the process progresses to step S14, and the corresponding motion statement (program line) is output along with a warning (e.g., displayed on a display or notified by voice).

In the next step S15, a mitigating motion is generated so that the instantaneous voltage drop amount $\Delta Vt_0$ becomes equal to or less than L1, and is output (e.g., displayed on a display or notified by voice). This mitigating motion can be obtained, for example, by lowering the movement speed or acceleration of the robot to a certain rate (e.g., 80%). Further, in the case that $\Delta Vt_0$ does not become equal to or less than L1 even if the movement speed or acceleration of the robot is lowered to the certain rate, the same process may be repeated (e.g., 80%×80%).

Since the operator can recognize that there is a motion (statement) to be mitigated by the output (display) of step S14, the operator can correct or change the motion statement in the robot program by modifying the motion statement and/or by teaching the robot, so that the voltage drop causing an alarm does not occur. In addition, since the operator can understand as to how the motion should be mitigated by the output (display) of step S15, the operator can correct or change the robot program more efficiently.

Instead of or in addition to steps S14 and S15, the program generation device 16 may automatically mitigate or modify the motion (statement) to be mitigated, and may automatically change the robot program accordingly (step S16). In this case, the operator does not need to correct or change the robot program by himself or herself.

Second Example

Figure 4:
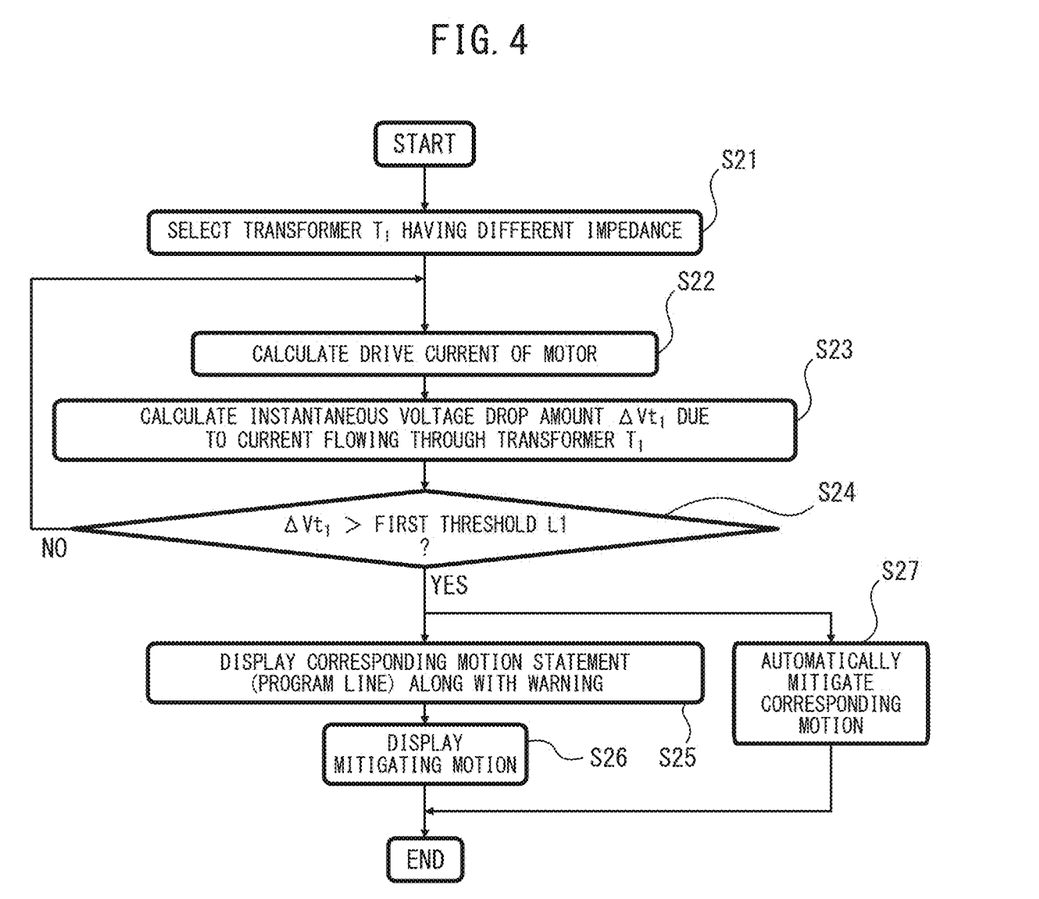
FIG. 4 is a flowchart showing a second example of a process of a program generation device.

FIG. 4 is a flowchart showing an example of a process in the program generation device 16 as the second example. The second example may be generally similar to the first example, but the program generation device 16 can first set the value of the impedance of the transformer 28 in step S21. The impedance value may be set by the operator, etc., by using an appropriate input device (keyboard, touch panel, etc.), or may be automatically set by the processor, etc., of the program generation device 16 based on past results, etc.

In general, smaller transformers are less costly, but tend to have higher impedance, so that the use of smaller transformers results in a larger instantaneous voltage drop. Therefore, for example, when the instantaneous voltage drop amount $\Delta Vt_0$ of the transformer $T_0$ used in the calculation in the first example exceeds L1, it is possible to reduce the frequency with which the instantaneous voltage drop $\Delta Vt_1$ exceeds L1 by selecting a transformer Ti having a lower impedance (i.e., larger) than the transformer $T_0$.

The processes of steps S22 to S27 may be the same as steps S11 to S16 of the first example, respectively, and thus the detailed explanation thereof will be omitted. By making it possible to select transformers having different impedances as in the second example, it is possible to make use of the selection of actual transformers.

Third Example

Figure 5:
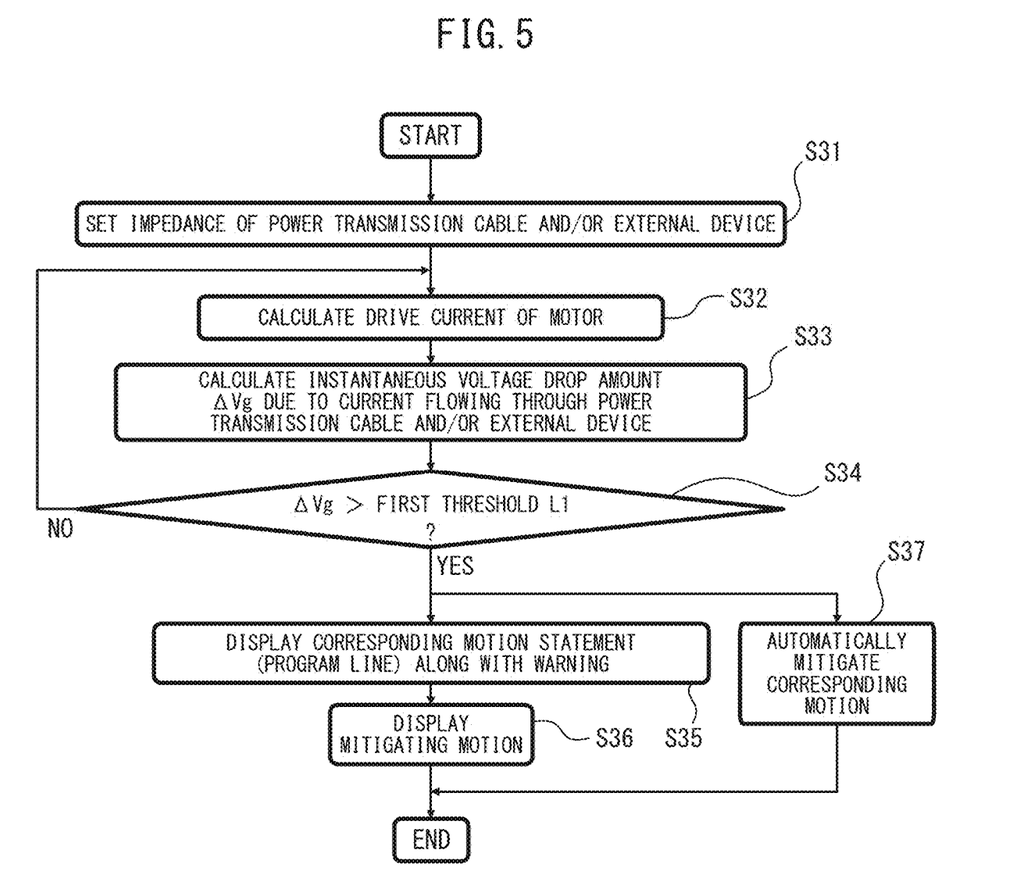
FIG. 5 is a flowchart showing a third example of a process of a program generation device.

FIG. 5 is a flowchart showing an example of a process in the program generation device 16 as the third example. In the third example, in step S31, the impedance of at least one of the power transmission cable 23 or the external device 26 can be set, so that the simulation can be performed considering the influence of one or both of the power transmission cable 23 and the external device 26. The setting of the impedance values of the power transmission cable and the external device may be performed by the operator, etc., by using an appropriate input device (keyboard, touch panel, etc.), or may be automatically set by the processor, etc., of the program generation device 16 based on past results, etc.

The transformer 28 may significantly affect the amount of instantaneous voltage drop which occurs when the current flows through the servomotor 20, etc. In addition, the power transmission cable 23 and the external device 26 may also cause an unignorable instantaneous voltage drop, depending on their impedance. Therefore, in the third example, first, in step S31, the impedance value of at least one of the power transmission cable 23 or the external device 26 is set. This impedance value can be obtained, for example, from past performance or data.

In the next step S32, a drive current I to be supplied to the servomotor 20, etc., which is necessary for executing a certain motion statement in the robot program, is calculated. Next, in step S33, an instantaneous voltage drop amount $\Delta Vg$ due to the transformer 28 and at least one of the power transmission cable 23 or the external device 26, when the drive current I flows through the servomotor 20, etc., is calculated.

The processes of steps S34 to S37 may be the same as steps S13 to S16 of the first example, respectively, and thus the detailed explanation thereof will be omitted. By making it possible to set the impedance of at least one of the power transmission cable or the external device, transformers having different impedances as in the second example, it is possible to perform more realistic simulations of the system including the power transmission cable and/or the external device.

Fourth Example

Figure 6:
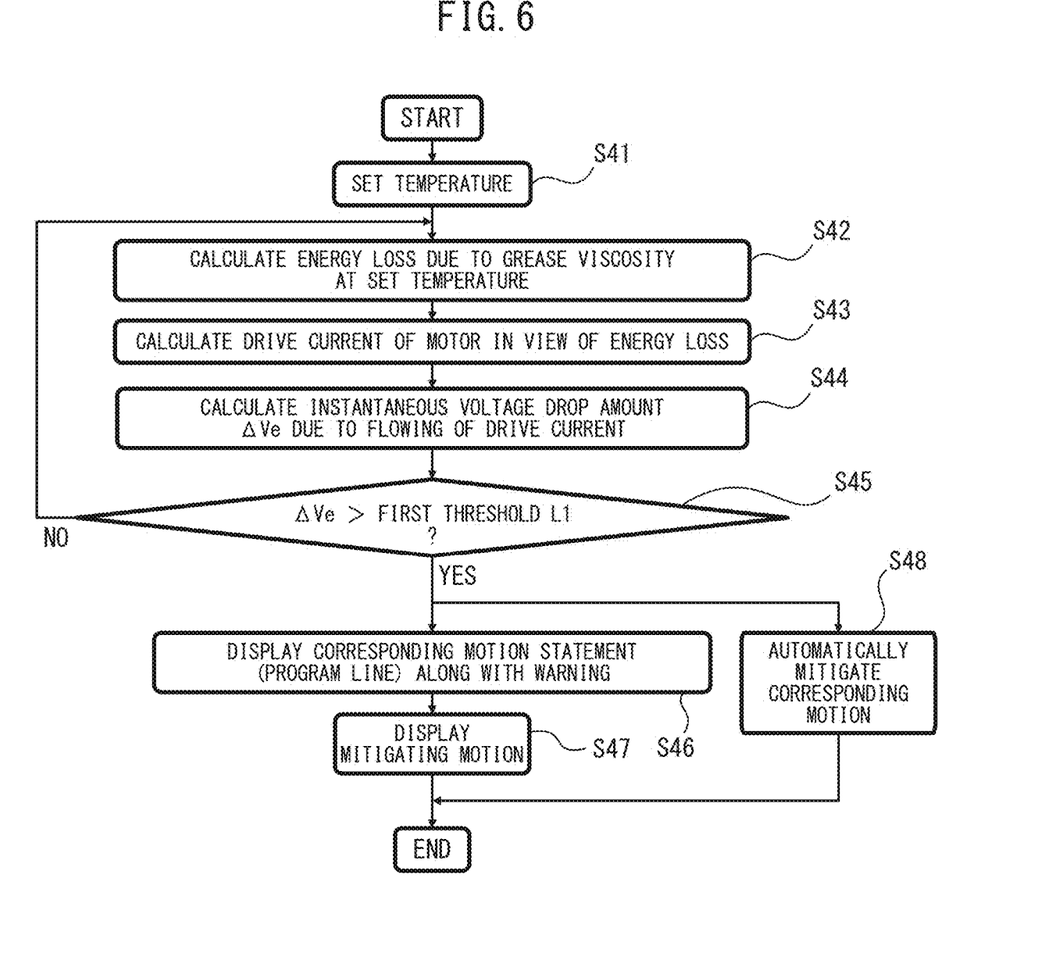
FIG. 6 is a flowchart showing a fourth example of a process of a program generation device.

FIG. 6 is a flowchart showing an example of a process in the program generation device 16 as the fourth example. For example, when the robot is used in a low-temperature environment, as the viscosity of grease used on each axis of the robot increases, the friction torque on each axis increases, requiring a larger drive current. As a result, even when the robot itself has no abnormality, a large voltage drop may occur due to the influence of the environmental temperature, and the robot may stop by alarm. Therefore, in the fourth example, a simulation can be performed in consideration of the energy loss due to the viscosity of the grease on each axis of the robot.

First, in step S41, the temperature such as a working temperature (environmental temperature) of the robot 12 is set. It is preferable that this set temperature be approximately equal to the temperature of the grease used for the joint of each axis of the robot. The temperature may be set by the operator, etc., via an appropriate input device (keyboard, touch panel, etc.), or may be automatically set by the processor, etc., of the program generation device 16 based on actual measurement values, etc.

In the next step S42, by using the viscosity value of the grease at the temperature set in S41 and/or the friction coefficient obtained from this viscosity value, the energy loss in each axis when the robot is moved according to the predetermined motion statement is calculated. Next, in step S43, the drive current for the servomotor 20, etc., is calculated in consideration of the energy loss obtained in S42. Next, in step S44, an instantaneous voltage drop amount $\Delta Ve$ due to the drive current obtained in S43 flowing through the controller 14, etc., is calculated.

The processes of steps S45 to S48 may be the same as steps S13 to S16 of the first example, respectively, and thus the detailed explanation thereof will be omitted. In general, when the environmental temperature drops, the viscosity of the grease increases, which in turn increases the energy loss in each axis of the robot, causing the drive current of the motor to increase, and as a result, the instantaneous voltage drop amount $\Delta Ve$ tends to increase. According to the fourth example, it is possible to calculate a change in the amount of instantaneous voltage drop in consideration of the viscosity of the grease. Therefore, it is possible to perform a simulation including the influence of the operating environment temperature of the robot.

Fifth Example

Figure 7:
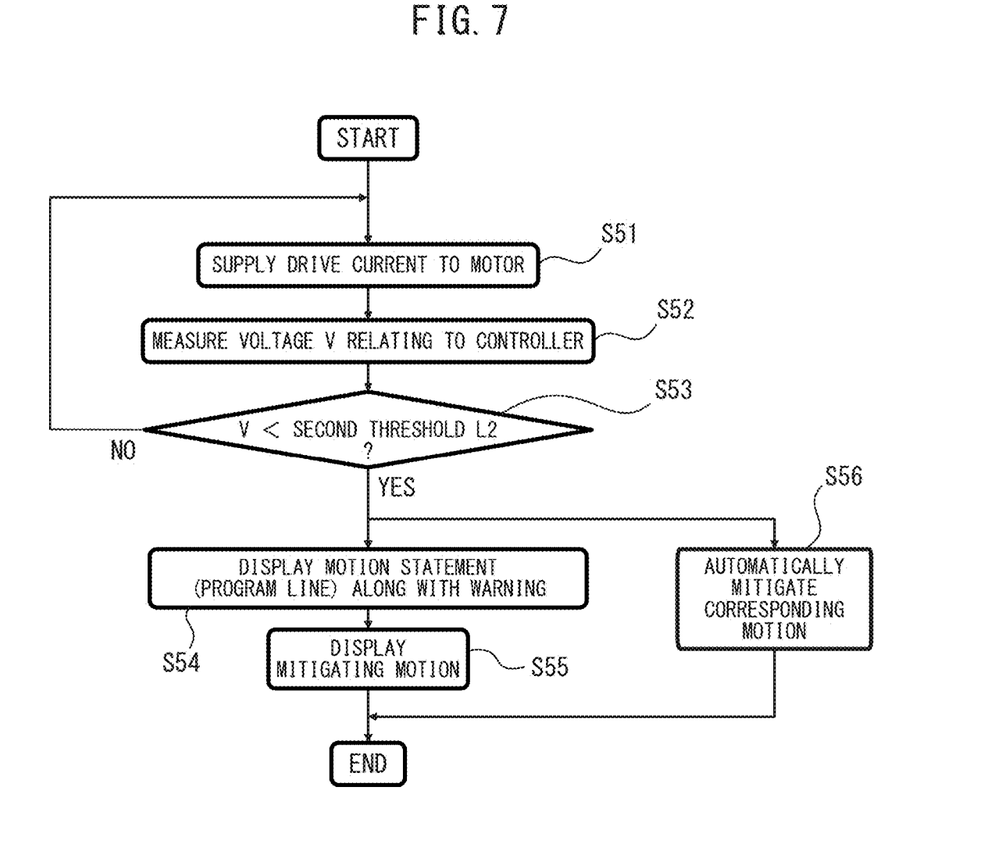
FIG. 7 is a flowchart showing a fifth example of a process of a program generation device.

While the above-described first to fourth examples relate to arithmetic processing (simulation) in the program generation device 16, the fifth example described with reference to FIG. 7 relates to processing in the robot controller 14. The major difference of the fifth example from the first to fourth examples is that the drive current is actually applied to the motor and the voltage drop is measured.

First, in step S51, the drive current for operating the robot 12 in accordance with the predetermined motion statement is actually supplied to the motor. Next, in step S52, by using at least one of the voltage sensor 38, 40 or 42 shown in FIG.

2A or 2B, the voltage V relating to the controller 14 (specifically, at the inlet, at the outlet, or inside the controller 14), when the drive current flow through the motor, is measured.

In the next step of S53, it is determined as to whether or not the measured voltage V obtained in S52 is below a predetermined second threshold value L2. When V is equal to or greater than L2, the process is returned to step S51 to perform the processing of the next motion statement (supplying the drive current and measuring the voltage). Although not shown in the flowchart, when there is no motion statement to be executed, the process is terminated without returning to step S51.

In step S53, when the measured voltage V is below the second threshold L2, i.e., when the voltage drop exceeds the certain value, it could be understood that the robot cannot follow the command, and the positional error exceeds the allowable value, causing the robot to stop with an alarm. In other words, the second threshold L2 is previously set to a value such that, when V is less than L2, it is estimated that there is a high probability that the positional error of the robot 12 due to the voltage drop will exceed the allowable value. In this case, the process progresses to step S54, and the corresponding motion statement (program line) is output along with a warning (e.g., displayed on a display or notified by voice).

In the next step of S55, a mitigating motion is generated so that the measured voltage V becomes equal to or larger than L2, and is output (e.g., displayed on a display or notified by voice). This mitigating motion can be obtained, for example, by lowering the movement speed or acceleration of the robot to a certain rate (e.g., 80%). Further, in the case that V does not become equal to or larger than L2 even if the movement speed or acceleration of the robot is lowered to the certain rate, the same process may be repeated (e.g., 80%×80%).

Since the operator can recognize that there is a motion (statement) to be mitigated by the output (display) of step S54, the operator can correct or change the motion statement in the robot program by modifying the motion statement and/or by teaching the robot, so that the voltage drop causing an alarm does not occur. In addition, since the operator can understand as to how the motion should be mitigated by the output (display) of step S55, the operator can correct or change the robot program more efficiently.

In the fifth example, since the drive current is actually applied to the motor and the voltage is measured, it is possible to accurately find out a condition under which the robot may be stopped by alarm, and to efficiently determine a mitigating motion to avoid the stoppage of the robot. In other words, the actual impedance of the system including the transformer and external devices can be obtained by calculation using the measured voltage (voltage drop amount) and the drive current. Therefore, by calculation using the calculated impedance and the second threshold value (the voltage at which an alarm does not occur), it is possible to easily determine the drive current value (target current value) which does not cause an undesirable voltage drop.

Instead of or in addition to steps S54 and S55, the controller 14 may automatically mitigate/modify the motion (statement) to be mitigated, and may control the robot 12 based on the mitigated or modified motion. In this case, the operator does not need to modify or change the robot program by himself/herself.

Each example described above is particularly useful when the robot system 10 is applied to a production line in a factory, etc., for the following reasons. In general, a production line is constructed by multiple robots, and each line often cooperates with each other to perform a series of processes. Therefore, when one robot suddenly stops due to an alarm, etc., the entire production line will stop, with the risk that the production efficiency will be significantly reduced.

It will be readily understood by a person skilled in the art that the above examples can be combined as appropriate. For example, by combining all of the second, third and fourth examples, it is possible to perform a highly accurate simulation of a robot system including a transformer, a power transmission cable and an external device, taking into consideration a change in environmental temperature (grease viscosity).

According to the present disclosure, by the simulation using the program generation device, it is possible to identify and correct the robot motion which may cause the excessive voltage drop, so eliminate the motion which may cause an alarm before activating the production line, etc., including the robot. In addition, by measuring the internal voltage, the input voltage value or the output voltage value of the robot controller, the motion which may generate an alarm indicating an excessive positional error due to the excessive voltage drop can be identified and corrected at the time of start-up of the production line. Therefore, it is possible to reduce the possibility that the robot will stop by alarm by reducing the speed or acceleration of the robot or by changing the teaching position of the robot before the actual production line operation. In either case, the entire system including the robot can be stabilized, and improvement in productivity can be expected.

REFERENCE SIGNS LIST

10 robot system
12 robot
14 controller
16 program generation device
20 servomotor
22 motor
23 power transmission cable
24 facility power supply
26 external device
28 transformer
30 amplifier/converter unit
32 amplifier/inverter unit
34 DC link
38, 40, 42 voltage sensor

The invention claimed is:

1. A program generation device configured to generate a motion program for controlling a robot configured to be operated by driving at least one motor, the program generation device comprising:
   a current calculation unit configured to calculate a value of a drive current to be supplied to the motor so that the robot is operated in accordance with the motion program;
   a drop voltage calculation unit configured to calculate an amount of instantaneous drop voltage in an electric circuit between the motor and a facility power supply for supplying a current to the motor, based on the value of the drive current calculated by the current calculation unit and a configuration of the electric circuit;

a comparison unit configured to compare the amount of instantaneous drop voltage calculated by the drop voltage calculation unit with a predetermined first threshold value; and an output unit configured to output a corresponding motion or a mitigating motion when the amount of instantaneous drop voltage is higher than the first threshold value, and/or a correction unit configured to correct the corresponding motion to the mitigating motion in the motion program when the amount of instantaneous drop voltage is higher than the first threshold value.

2. The program generation device according to claim 1, wherein the program generation device is configured to be able to set a value of impedance of a transformer included in the electric circuit, when the amount of instantaneous drop voltage is calculated.

3. The program generation device according to claim 1, wherein the program generation device is configured to be able to set a value of impedance of at least one of an external device or a power transmission cable included in the electric circuit, when the amount of instantaneous drop voltage is calculated.

4. A program generation device configured to generate a motion program for controlling a robot configured to be operated by driving at least one motor, the program generation device comprising:

a current calculation unit configured to calculate a value of a drive current to be supplied to the motor so that the robot is operated in accordance with the motion program;

a drop voltage calculation unit configured to calculate an amount of instantaneous drop voltage in an electric circuit between the motor and a facility power supply for supplying a current to the motor, based on the value of the drive current calculated by the current calculation unit and a configuration of the electric circuit;

a comparison unit configured to compare the amount of instantaneous drop voltage calculated by the drop voltage calculation unit with a predetermined first threshold value; and an output unit configured to output a corresponding motion or a mitigating motion when the amount of instantaneous drop voltage is higher than the first threshold value, and/or a correction unit configured to correct the corresponding motion to the mitigating motion I the motion program when the amount of instantaneous drop voltage is higher than the first threshold value, wherein the program generation device is configured to take into account an amount of energy loss due to viscosity of grease used for each axis of the robot at a working temperature of the robot, when the drive current is calculated.

5. A robot controller configured to control a robot configured to be operated by driving at least one motor, based on a motion program, the robot controller comprising:

a voltage measurement unit configured to measure a value of a voltage at an inlet, an outlet or an inside of the robot controller, when a drive current is supplied to the motor for operating the robot in accordance with the motion program;

a comparison unit configured to compare the value of the voltage measured by the voltage measurement unit with a predetermined second threshold value; and a correction unit configured to calculate an impedance of a system including the robot based on a value of the drive current supplied to the motor and the value of the voltage measured by the voltage measurement unit, generate a mitigation motion using the impedance and the second threshold, and correct a corresponding motion to the mitigating motion in the motion program when the value of the voltage is lower than the second threshold value, and/or, an output unit configured to output the mitigating motion in the motion program when the value of the voltage is lower than the second threshold value.

6. The robot controller according to claim 5, wherein the correction unit calculates a value of a target drive current, by which the value of the voltage measured by the voltage measurement unit is equal to or greater than the second threshold, and automatically generates the mitigating motion based on the value of the target drive current.

* * * * *